US011808316B2

(12) United States Patent
Wu et al.

(10) Patent No.: US 11,808,316 B2
(45) Date of Patent: Nov. 7, 2023

(54) ENERGY DAMPENERS FOR ELECTRONIC DEVICES

(71) Applicant: Hewlett-Packard Development Company, L.P., Spring, TX (US)

(72) Inventors: Kuan-Ting Wu, Taipei (TW); Chung-Hua Ku, Taipei (TW); Chi Hao Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/852,782

(22) Filed: Jun. 29, 2022

(65) Prior Publication Data

US 2022/0349452 A1 Nov. 3, 2022

Related U.S. Application Data

(63) Continuation of application No. 17/046,017, filed as application No. PCT/US2018/049324 on Sep. 4, 2018, now Pat. No. 11,401,992.

(51) Int. Cl.

| *F16F 1/36* | (2006.01) |
|---|---|
| *C08K 3/04* | (2006.01) |
| *C08K 3/36* | (2006.01) |
| *C08K 5/09* | (2006.01) |
| *C08K 13/02* | (2006.01) |
| *G11B 33/08* | (2006.01) |
| *H01H 13/14* | (2006.01) |
| *B82Y 30/00* | (2011.01) |
| *B82Y 40/00* | (2011.01) |

(52) U.S. Cl.
CPC ............ *F16F 1/3605* (2013.01); *C08K 3/041* (2017.05); *C08K 3/042* (2017.05); *C08K 3/36* (2013.01); *C08K 5/09* (2013.01); *C08K 13/02* (2013.01); *G11B 33/08* (2013.01); *H01H 13/14* (2013.01); *B82Y 30/00* (2013.01); *B82Y 40/00* (2013.01); *C08K 2201/006* (2013.01); *C08K 2201/011* (2013.01); *C08K 2201/014* (2013.01); *F16F 2224/02* (2013.01); *F16F 2224/025* (2013.01); *F16F 2226/04* (2013.01); *H01H 2221/062* (2013.01)

(58) Field of Classification Search
CPC ................ F16F 1/3605; F16F 2224/02; F16F 2224/025; F16F 2226/04; C08K 3/041; C08K 3/042; C08K 3/36; C08K 5/09; C08K 13/12; C08K 2201/006; C08K 2201/011; C08K 2201/014; G11B 33/08; H01H 13/14; H01H 2221/062; B82Y 30/00; B82Y 40/00; B82Y 10/00; G06F 1/1633

See application file for complete search history.

(56) References Cited

U.S. PATENT DOCUMENTS

| 5,601,938 | A | * | 2/1997 | Mayer ..................... H01M 8/08 |
|---|---|---|---|---|
| | | | | 429/514 |
| 7,064,265 | B2 | * | 6/2006 | Cochrane ........... G11B 33/1493 |
| 7,259,342 | B2 | | 8/2007 | Lin et al. |
| 7,557,312 | B2 | | 7/2009 | Clark et al. |
| 8,809,230 | B2 | | 8/2014 | Worsley et al. |
| 8,926,201 | B2 | | 1/2015 | Chen |
| 2006/0061904 | A1 | * | 3/2006 | Neal ....................... G11B 33/02 |
| | | | | 360/99.15 |
| 2008/0031673 | A1 | | 2/2008 | Chang et al. |
| 2010/0187484 | A1 | | 7/2010 | Worsley et al. |
| 2012/0028798 | A1 | | 2/2012 | Worsley et al. |
| 2012/0034442 | A1 | | 2/2012 | Pauzauskie et al. |
| 2017/0261456 | A1 | | 9/2017 | Lewicki et al. |

FOREIGN PATENT DOCUMENTS

| CN | 2636299 | 8/2004 |
|---|---|---|
| RU | 2577273 | 3/2016 |
| WO | 200042708 | 7/2000 |

OTHER PUBLICATIONS

Ivan Lavrenov, Airgel made of graphene and carbon nanotubes is devoid of the disadvantages of its predecessors, Science News, 2013, https://elementy.ru/novosti_nauki/432045 accessed Jun. 29, 2022.

* cited by examiner

*Primary Examiner* — Jane L Stanley
(74) *Attorney, Agent, or Firm* — HP Inc. Patent Department

(57) ABSTRACT

An electronic device can include a first electronic component, a second electronic component, and an energy dampener positioned between and in contact with the first electronic component and the second electronic component. The energy dampener in this example includes a carbon nanotube-aerogel matrix including carbon nanotubes embedded in an aerogel with a rubber composited therewith.

20 Claims, 3 Drawing Sheets

ENERGY DAMPENERS FOR ELECTRONIC DEVICES

The present application is a continuation of U.S. application Ser. No. 17/046,017 filed on Oct. 8, 2020, which was a 35 U.S.C 371 U.S. National Stage Application of PCT/US2018/049324 filed on Sep. 4, 2018, each which is incorporated herein by reference.

BACKGROUND

There are many components in electronic devices that contact one another and in some instances, those components in operation can created unwanted vibrations or resonances. For example, many electronics devices included buttons or data input assemblies with components that come into contact, or include hard drives or other components with moving parts that can create vibrations when mounted to frames, brackets, or other components.

DETAILED DESCRIPTION

Figure 1:
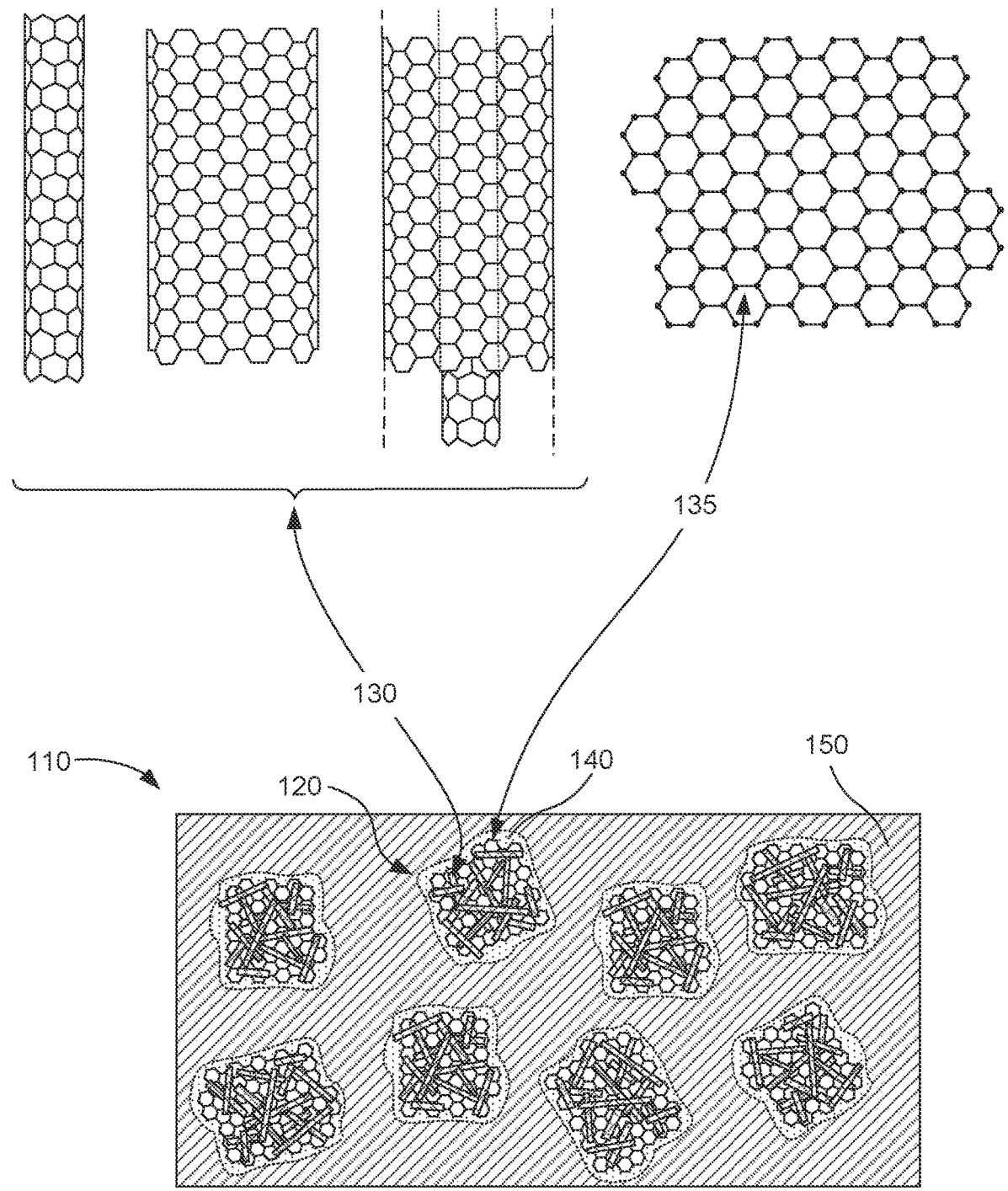
FIG. 1 graphically and schematically illustrates an example energy dampener with a carbon nanotube-aerogel matrix that is composited with a rubber in accordance with the present disclosure.

An example energy dampener for an electronic device can include a carbon nanotube-aerogel matrix, including carbon nanotubes embedded in an aerogel as well as a rubber composited with the carbon nanotube-aerogel matrix. In one example, the carbon nanotubes can have a surface area of about 400 $m^2/g$ to about 2,500 $m^2/g$. In other examples, the carbon nanotubes can include single-walled carbon nanotubes and/or multi-walled carbon nanotubes including an inner nanotube concentrically positioned within an outer nanotube. The aerogel can be a graphene aerogel, a silica aerogel, a plastic aerogel, or a combination thereof. In one example, the aerogel can have a surface area of about 1,500 $m^2/g$ to about 3,500 $m^2/g$. The rubber can include silicone rubber, ethylene propylene diene monomer (EPDM rubber), epichlorohydrin rubber, polyacrylic rubber, fluorosilicone rubber, fluoroelastomer, perfluoroelastomer, polyether block amide, chlorosulfonated polyethylene, ethylene-vinyl acetate, polysulfide rubber, thermoplastic elastomer, or a combination thereof. In one example, the carbon nanotube-aerogel matrix can also include graphene embedded in the aerogel.

In another example, an electronic device can include a first electronic component, a second electronic component, and an energy dampener positioned between and in contact with the first electronic component and the second electronic component. The energy dampener can include a carbon nanotube-aerogel matrix including carbon nanotubes embedded in an aerogel, and the carbon nanotube-aerogel matrix can be composited with a rubber. In one example, a third electronic component can also be present with the energy dampener also positioned between the first electronic component and the third electronic component. In another example, the energy dampener can still further be between the second electronic component and the third electronic component (in addition to between the first and second electronic components). In another example, the first electronic component can include one of a computer keyboard link bar or a keystroke plate, the second electronic component can include the other of the computer keyboard link bar or keystroke plate. In still another example, the first electronic component can include one of a fastener or a hard drive, and the second electronic component can include the other of the fastener and the hard drive, e.g., with a bracket or other co-fastener associated with the hard drive to fasten the hard drive to a support frame or other structure using the fastener.

In another example, a method of damping energy within an electronic device can include applying an energy dampener to a first interface of a first electronic component, wherein the energy dampener includes a carbon nanotube-aerogel matrix including carbon nanotubes embedded in an aerogel with a rubber composited therewith. The method can further include positioning a second interface of second electronic component against the energy dampener. The energy dampener can thus be in contact and between the first electronic component and the second electronic component to dampen energy transfer from the first electronic component to the second electronic component or from the second energy component to the first energy component. In one example, the method can include preliminarily compounding the carbon nanotube-aerogel matrix with the rubber by admixing the rubber with the carbon nanotube-aerogel matrix in the presence of a lubricant to form an extrudable composite. Thus, applying in this instance can include extruding the extrudable composite onto the first interface under heat. In further detail, the method can include shaping the energy dampener after applying to the first interface or after positioning the second interface by removing a portion of the energy dampener.

It is noted that when discussing the energy dampener, electronic device, or method of damping energy within an electronic device herein, these discussions can be considered applicable to one another whether or not they are explicitly discussed in the context of that example. Thus, for example, when discussing an energy dampener, such disclosure is also relevant to and directly supported in the context of an electronic device, methods of damping energy, vice versa, etc. It is also understood that terms used herein will take on their ordinary meaning in the relevant technical field unless specified otherwise. In some instances, there are terms defined more specifically throughout or included at the end of the present disclosure, and thus, these terms are supplemented as having a meaning as described herein.

Carbon Nanotube-Aerogel Matrix

Carbon nanotube-aerogel matrices include multiple materials, namely the aerogel and the carbon nanotubes, which are embedded or dispersed in the aerogel. Graphene or other similar structures can also be present within the aerogel, for example. The carbon nanotubes can typically be tubular shaped carbon structures that can be produced to have diameters in the nanometer range, with lengths in the micron range. Carbon nanotubes can have high electrical conductivity, tensile strength, flexibility, elasticity, and thermal conductivity among other properties which make them versatile and effective nanostructures for many purposes. They can be produced using multiple methods, such as but not limited to, applying an electrical current across two carbonaceous electrodes in an inert gas atmosphere, plasma arcing in the presence of cobalt, using laser vaporization of graphite rods with a catalyst mixture, chemical vapor deposition, ball miffing, and other methods. In examples related to the energy dampeners, electronic devices, or methods disclosed herein, the carbon nanotubes can have a surface area of about 400 $m^2/g$ to about 2,500 $m^2/g$. In other examples, the carbon nanotubes can have a surface area of about 800 $m^2/g$ to about 2,000 $m^2/g$. In further examples, the carbon nanotubes can have a surface area of about 1,000 $m^2/g$ to about 1,800 $m^2/g$.

In an example, the carbon nanotubes include single-walled carbon nanotubes. Single-wall carbon nanotubes (SWNTs) are considered one-dimensional materials and include sheets of graphene that are rolled to form hollow tubes with walls one atom thick. In another example, the carbon nanotubes include multi-walled, e.g., double-walled or triple-walled, carbon nanotubes including an inner nanotube concentrically positioned within an outer nanotube. For example, double-walled carbon nanotubes (DWCNTs) are also considered one-dimensional material, but include two (single-walled) nanotubes, one nested inside the other, typically concentrically. Triple-walled (and beyond) carbon nanotubes include multiple (single-walled) nanotubes nested inside one another with an outermost nanotube, and innermost nanotube, and one or more nanotubes positioned therebetween. Sometimes the term "multi-walled" refers to three or more carbon nanotubes that are nested together, but as defined herein, the term "multi-walled carbon nanotubes" includes double-walled, triple-walled, etc., carbon nanotubes. Carbon nanotubes that are single-walled may be obtained from Sigma-Aldrich under product codes 704121, 805033, 773735, 704113, and others (CAS #308068-56-6); or from Ossila (United Kingdom) with codes M2015L1 (30 μm—90%—OH Functionalisation), M2014L1 (30 μm—90% —COOH Functionalisation), M2013L2 (30 μm—95%), or M2013L1 (20 μm—95%). Double-walled carbon nanotubes may be obtained from Sigma-Aldrich under product codes 637351, 755168, or 755141; or from Ossila under product codes M2017L1 or M2016L1 (Doubled Walled Carbon Nanotube), M2017L1 (COOH Functionalised), or M2018L1 (OH Functionalised), for example. Other multi-walled nanotubes, including triple-walled and beyond, can be obtained from Ossila under product codes M2008D1 (which can be further identified as Multi-Walled—95%; Multi-Walled—99%; Multi-Walled COOH; or Multi-Walled OH). Other providers of carbon nanotubes can also be used. The carbon nanotubes can be carboxylated or hydroxylated. In one specific example, the carbon nanotubes can be functionalized with hydroxyl groups.

In these examples, the carbon nanotubes can have an average length of about 0.2 μm to about 50 μm, from about 0.2 μm to about 30 μm, from about 0.2 μm to about 20 μm, from about 0.2 μm to about 10 μm, from about 0.2 μm to about 5 μm, from about 0.4 μm to about 3 μm, or from about 0.5 μm to about 2 μm. The carbon nanotubes can be obtained at various lengths and can be cut or otherwise shorted down to size, or can be obtained at lengths for inclusion. The width (or diameter in many instances) can vary, with a width to length aspect ratio of about 1:20 to about 1:10,000, 1:20 to about 1:5,000, from about 1:100 to about 1:5,000, or from about 1:100 to about 1:2,500, for example.

Aerogels tend to be ultralight, compressible, and highly porous materials. Aerogels can be produced by initially preparing a gel and then drying the gel in a manner which retains the aerogel porous structure. In some examples, aerogels can be purified by removing impurities prior to drying so that the impurities do not interfere with the drying process or retaining of the aerogel structure. For example, purification can be carried out by soaking a gel or colloidal particles used to form the gel in a pure solvent to allow impurities to diffuse out of the gel and pure solvent to diffuse in. The drying can include, for example, critical point- or supercritical drying, e.g., drying the gel at the temperature and pressure in which the liquid and/or vapor phases of the gel merge into a single phase exhibiting gaseous behaviors while maintaining the density and thermal conductivity of a fluid. Silica aerogel, the most common type of aerogel, can be produced by extracting liquid from a framework of silica gel in a way that preserves the majority of the gel framework's original volume. Graphene aerogel, which is one of the least dense solids, can be produced by assembling graphene oxide into a monolithic graphene hydrogel and subjecting it to the aerogel production process. In examples related to the energy dampeners, electronic devices, or methods disclosed herein, the aerogel can include a graphene aerogel, a silica aerogel, plastic aerogel, or some other aerogel. The surface area of the aerogel can be from about 1,500 $m^2/g$ to about 3,500 $m^2/g$. In another example, the surface area can be from about 1,500 $m^2/g$ to about 3,500 $m^2/g$.

Graphene compounds can provide a structural basis for the carbon nanotubes, for example. Thus, graphene is a sheet-like structure that is one layer in thickness an atomic scale and provides the basis for forming other types of carbon allotropes, such as graphite, charcoal, carbon nanotubes, fullerenes, etc. Graphene can also be the basis for forming graphene aerogels. Graphene can also be stacked to form multi-layered structures. It is noted that graphene may also be embedded in (carried by), but not a part of the aerogel structure per se, regardless of the type of aerogel structure used, e.g., graphene aerogel, silica aerogel, plastic aerogel, etc. Thus, graphene can be used in multiple contexts, namely to describe a material in and of itself as an atomic layer or multi-layered structure with a carbon lattice configuration, or in the context of an aerogel that is based on carbon, e.g., graphene aerogel, or as the material used to form a carbon nanotube. Graphene, whether used as part of an aerogel, used to form a carbon nanotube, or embedded within an aerogel can be obtained from Ossila (United Kingdom) under product codes M901 (Monolayer—2 μm); M902 (Monolayer—5 μm, Multilayer—6 μm, Multilayer—80 μm, or as Nanoplatelets). Graphemes can also be obtained as chemically or thermally reduced compounds, e.g., M921 or M951, from Osilla, among other types.

Carbon nanotube-aerogel matrices, which included carbon nanotubes embedded or dispersed in an aerogel (and in some instances also include graphene embedded therein as well) can have large surface areas (relative to the total volume of material) due to high porosity as well as good thermal insulating characteristics. They can be produced through multiple processes, including dispersing carbon nanotubes (and in some cases also dispersing graphene) in a gel with a solvent and/or other reactants/catalysts and subjecting a resulting gel to supercritical point drying (similar to that described previously with respect to formation of the aerogel). The gel used to disperse the carbon nanotubes can be prepared using a sol-gel preparation of colloidal particles which are aged (over time) with reactants/solvents, sometimes with a catalyst, to generate a continuous network of colloidal particles, or the gel-precursor of the aerogel. Thus, after admixing the gel-precursor with the carbon nanotubes, a drying process can be carried out, such as supercritical drying, where the temperature and pressure is raised above critical point to form a supercritical fluid followed by slow reduction of temperature and pressure, to preserve the aerogel network that is formed by the drying process (which includes the carbon nanotubes dispersed or embedded therein). In some examples, to form a carbon-based aerogel, a carbonization step can occur under heat for several hours, e.g., about 600° C. to about 2500° C. for about 2 to about 12 hours. The gel precursor, on the other hand, can be prepared initially as a carbon-based aerogel by using graphene oxide to form the gel-precursor. In this example, the graphene aerogel prepared therefrom can be used as a template for the growth of carbon nanotubes. Thus, the carbon nanotubes and the aerogel can be prepared separately and combined together prior to drying to form the aerogel, or can be prepared stepwise as part of a chemical process where both materials are formed in situ. In either case, the carbon nanotube-aerogel matrix includes carbon nanotubes that are embedded or dispersed in an aerogel network as a carbon nanotube-aerogel matrix.

Rubber

Rubber can be composited with a carbon nanotube-aerogel matrix as a unitary film layer with the rubber admixed with the carbon nanotube-aerogel matrix. In another example, the carbon nanotube-aerogel matrix may be layered with the rubber, e.g. coextruded together to form two unique layers that are composited together as a unified composited structure. The rubber can be, for example, a natural or a synthetic rubber. Natural rubbers can be produced by extracting latex from plants and subjecting the latex to further refining processes such as but not limited to mastication, chemical refining, extrusion, and vulcanization. Synthetic rubbers can be produced using petrochemicals and processes that vary depending on the desired product and the particular use of the synthetic rubber. In electronics, rubbers of various types can be used, including those with electrical properties appropriate for a specific application. These types of properties may not typically impact the effectiveness of the energy dampener, but in some instances, if the energy dampener is to be positioned in close proximity to a conductive component, more insulated rubber materials may be selected for use.

Example rubbers that can be used include silicone rubber, EPDM rubber, epichlorohydrin rubber, polyacrylic rubber, fluorosilicone rubber, fluoroelastomer, perfluoroelastomer, polyether block amide, chlorosulfonated polyethylene, ethylene-vinyl acetate, polysulfide rubber, thermoplastic elastomer, or a combination thereof. The rubber can have a weight average molecular weight of from about 20,000 Mw to about 1,500,000 Mw, from about 30,000 Mw to about 1,400000 Mw, or from about 50,000 Mw to about 1,300,000 Mw, or from about 100,000 Mw to about 1,000,000 Mw, for example.

Composites

In examples of the energy dampeners, electronic devices, or methods disclosed herein, the carbon nanotube-aerogel matrix can be composited with rubber in the form of an extruded film or films. The film or films can be shaped/position between multiple electronic component structures to dampen unwanted energy that may be generated. For example, the rubber can be composited with the carbon nanotube-aerogel matrix using a hot melt extrusion process, where a ribbon of liquefied or flowable carbon nanotube-aerogel matrix and rubber are extruded together to form a single or unitary film, which can be shaped to address a surface of two adjacent electronic components within an electronics device. Alternatively, the carbon nanotube-aerogel matrix and the rubber can be coextruded as two separate layers, which can integrate the layers together. Either way, example extrusion temperatures for forming the extrusion film(s) can be from about 120° C. to about 300° C., or from about 135° C. to about 275° C., for example, depending on the carbon nanotube-aerogel matrix and rubber selected, e.g., softening or melt flow temperatures, etc. Extrusions can be carried out, in some examples, with compounds added to provide appropriate lubrication, such as stearic acid, zinc stearate, etc. The addition of such lubricants can be particularly useful when compositing the carbon nanotube-aerogel matrix with the rubber for extrusion as a common film or structure. Concentrations of the lubricant can be appropriate to generate a flowable extrudable film, for example, but in one instance, the concentration can be from about 0.1 wt % to about 5 wt %, from about 0.25 wt % to about 3 wt %, or from about 0.5 wt % to about 2 wt %. The thickness of the extruded film(s) can be from about 0.025 mm to about 5 mm, from about 0.05 mm to about 3 mm, or from about 0.1 mm to about 2 mm to, for example. Additionally, the density of the extruded film can be from about 0.008 $g/cm^3$ to about 0.8 $g/cm^3$, about 0.01 $g/cm^3$ to about 0.7 $g/cm^3$ about, or about 0.01 $g/cm^3$ to about 0.5 $g/cm^3$, for example.

In one example, a composite of the carbon-nanotube-aerogel with rubber can include from about 80 wt % to about 99.5 wt % rubber, and from about 0.5 wt % to about 20 wt % carbon nanotube-aerogel matrix. In another example, the composite can include from about 90 wt % to about 99 wt % rubber, and from about 1 wt % to about 10 wt % carbon nanotube-aerogel matrix. In another example, the composite can include from about 95 wt % to about 99 wt % rubber, and from about 1 wt % to about 5 wt % carbon nanotube-aerogel matrix.

To provide a few specific example, the aerogel can be a silica aerogel, carbon nanotubes can be dispersed in the silica aerogel, and the rubber can be a silicone rubber. The carbon nanotubes can be single-walled or multi-walled in this example or any of the other examples herein. In another example, the aerogel can be a silica aerogel, carbon nanotubes can be dispersed in the silica aerogel, graphene can be dispersed in the silica aerogel, and the rubber can be a silicone rubber. In another example, the aerogel can be a graphene aerogel, carbon nanotubes can be dispersed in the graphene aerogel, and the rubber can be a silicone rubber. In another example, the aerogel can be a graphene aerogel, carbon nanotubes can be dispersed in the graphene aerogel. (free) graphene can be dispersed in the graphene aerogel, and the rubber can be a silicone rubber. In another example, the aerogel can be a silica aerogel, carbon nanotubes can be dispersed in the silica aerogel, and the rubber can be an EPDM rubber. In another example, the aerogel can be a silica aerogel, carbon nanotubes can be dispersed in the silica aerogel, graphene can be dispersed in the silica aerogel, and the rubber can be a fluorosilicone rubber. In another example, the aerogel can be a silica aerogel, carbon nanotubes can be dispersed in the silica aerogel, and the rubber can be an epichlorohydrin rubber. In another example, the aerogel can be a silica aerogel, carbon nanotubes can be dispersed in the silica aerogel, graphene can be dispersed in the silica aerogel, and the rubber can be a thermoplastic elastomer rubber. These and other combinations described herein are within the scope of the present disclosure.

Energy Dampeners and Electronic Devices

As shown in FIG. 1, a schematic view of an energy dampener 110 for an electronic device can include a carbon nanotube-aerogel matrix 120 including carbon nanotubes 130 embedded in an aerogel 140. The energy dampener also includes a rubber 150 composited with the carbon nanotube-aerogel matrix. In this example, there can also be graphene 135 embedded in the aerogel so that the carbon nanotube-aerogel matrix not only includes embedded carbon nanotubes, but also embedded graphene. Some examples may include embedded graphene and others may not. Notably, there are two different types of carbon nanotubes and graphene shown in FIG. 1 that can be used to be embedded in the aerogel, namely single-walled nanotubes, double-walled nanotubes, as well as the free graphene. If the aerogel is a graphene aerogel, the graphene may be included as part of the aerogel, and may also be included as being embedded in the graphene aerogel. If the aerogel is other than a graphene aerogel, e.g., silica aerogel, then the graphene may be embedded in the aerogel. The aerogel can be, for example, silica aerogel, graphene aerogel, plastic aerogel, or other similar aerogel. The carbon nanotube-aerogel matrix and the rubber materials can be as previously described. As a note, this FIG. is not to scale, but rather is shown schematically. For example, graphene can be used to form carbon nanotubes, and thus the graphene structure shown may be larger compared to the size of the carbon nanotubes shown. Likewise, the aspect ratios, and relative weight or volume percentages are not to scale.

Figure 2:
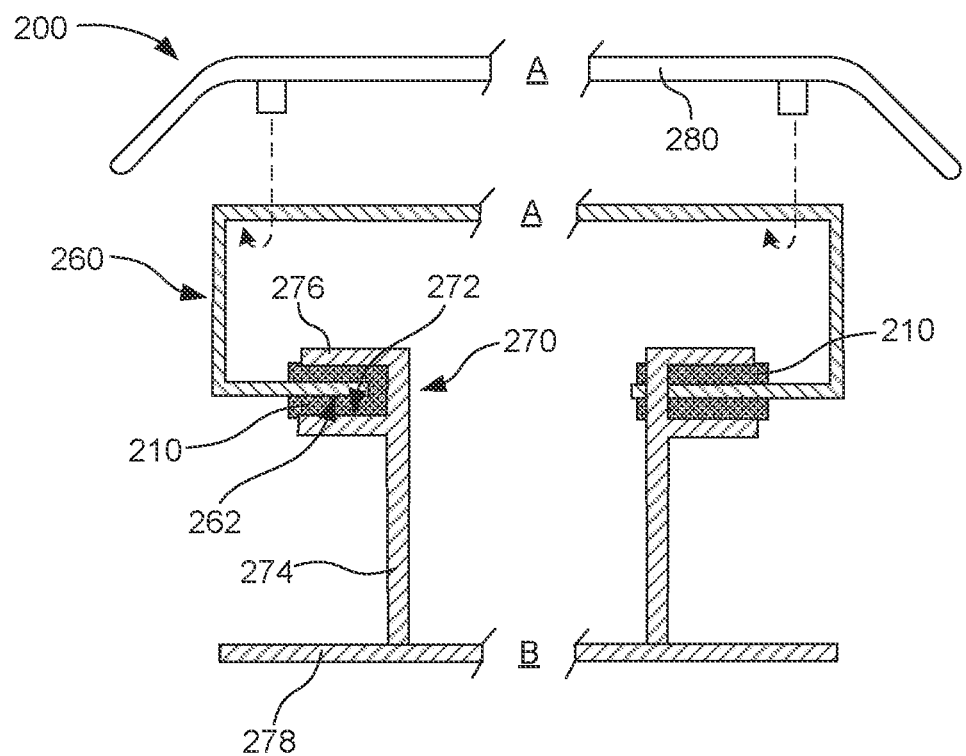
FIG. 2 schematically illustrates an example electronic device with multiple components including an energy dampener positioned between the multiple components in accordance with the present disclosure.
Figure 3:
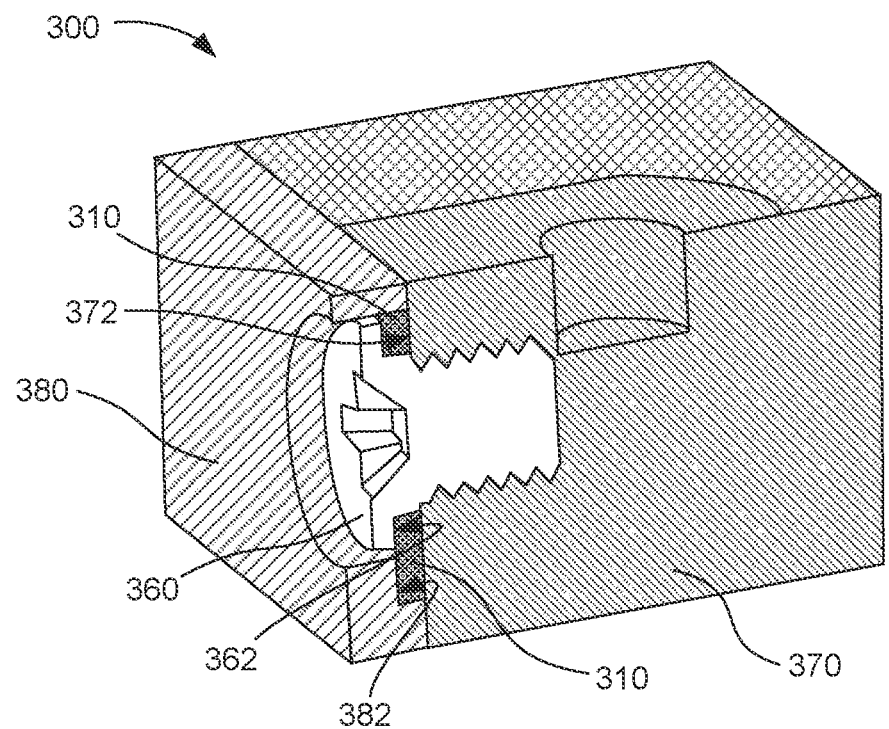
FIG. 3 schematically illustrates an alternative example electronic device with multiple electronic components including an energy dampener positioned between the multiple electronic components in accordance with the present disclosure.

FIGS. 2 and 3 depict example electronic devices (or portions thereof), with components assembled together. As an initial note, the possible electronic components that can be assembled together using the energy dampeners of the present disclosure can include, but are not limited to: structural components, such as a brackets, electronic device frames, fasteners, screws, etc.; operational components, such as hard drives, graphics cards, memory, chips, batteries, speakers, fans, etc.; and aesthetic components, such as LED lights, carbon fiber wraps, decals, etc. Some components can be two or more of structural, operational, or aesthetic. For example, a hard shell casing for a computer may be both structural and aesthetic. Thus, with respect to structure of two components with an energy dampener therebetween, the materials and configuration of the electronic components can vary, but can still be separated with appropriately configured energy dampeners prepared in accordance with the present disclosure. For example, the energy dampener can be positioned between and in contact with a first electronic component and a second electronic component. As mentioned, the energy dampener can include a carbon nanotube-aerogel matrix including carbon nanotubes embedded in an aerogel, and the carbon nanotube-aerogel matrix can be composited with a rubber. To provide two specific, non-limiting examples, the first electronic component can include a computer keyboard link bar and the second electronic component can include a keystroke plate. In another example, the first electronic component can include a fastener, e.g., screw, pin, clip, etc., to connect a frame or support to the second electronic component, which may be an electromechanical device, such as a hard drive. The hard drive may include a bracket or other similar structure to secure the hard drive to the frame or support using the fastener. The energy dampener can be positioned between the fastener and the hard drive (or hard drive bracket) to ameliorate vibration or other resonance that may occur.

More specifically, with respect to an example energy dampener for a keyboard, FIG. 2 depicts an electronic device 200 (or portion thereof) with a first electronic component 260 with a first interface 262, a second electronic component 270 with a second interface 272, and an energy dampener 210 positioned between and in contact with the first electronic component and the second electronic component. In this example, the first electronic component is a keyboard link bar (also 260), which can include the first interface to which the energy dampener can be applied. As a note, though not shown, there may be two link bars per key in some examples; one being shown in FIG. 2 pivoted upright (to provide visibility), but could also be pivoted up to about 45°, up to about 60°, up to about 75°, or up to about 90°, where it would engage with an underside of a key cap 280. There are also examples where there is only one link bar as well. Other structural arrangements may be used for the link bar, but this particular link bar is shown by way of example. The second electronic component in this example can be a keystroke plate (also 270). The plate includes multiple portions, in this example, including the second interface, a standoff portion 274, an engagement portion 276, and a support portion 278. The keystroke plate can provide mechanical communication between the link bar and the electrically operational portions of the key/keyboard, e.g., movement of capacitive or contact components, etc. Those operational features (not shown) may be present generally within the space shown at "B," which represents a location where operational components related to mechanical movement and electrical communication for the keyboard may be present. The spaces shown at "A" represent a remainder of a length of the key cap and the tie bar, which can be any length appropriate to the size of the key cap, e.g., a space bar and corresponding tie bar may typically be longer than an enter key and corresponding tie bar.

The energy dampeners 210 can be as described with respect to FIG. 1 and elsewhere herein, with a carbon nanotube-aerogel matrix composited with a rubber. Notably, on the right side, the tie bar 260 is shown penetrating the energy dampener and the keystroke plate 270, whereas on the left side, the tie bar is embedded in the energy dampener and the keystroke plate. This is to show that either configuration can be used with effective energy dampening. Thus, the energy dampener positioned between these two structures in any of a number of configurations can be used to ameliorate or prevent noise, vibrations, resonances, etc., caused by operation of the keyboard initially, as well as over a longer period of time than in instances where there is no energy dampener in place. As a note, the first electronic component in this example was assigned (arbitrarily) to the tie bar and the second electronic component was assigned to the keystroke plate. This could be reversed so that the energy dampener is applied to the "first interface" which would thus be on the keystroke plate, and the second interface could be on the tie bar. Thus, "first" and "second" are arbitrarily assigned and could apply to either structure.

In another example, FIG. 3 depicts an electronic device 300 (or cutaway portion thereof) with a first electronic component 360, a second electronic component 370, and an energy dampener 310 positioned between and in contact with the first electronic component and the second electronic component. Specifically, the first electronic component can be a fastener (also 360) with a first interface 362, which in this case is a threaded screw (shown in cross-section), and the second electronic component can be a hard drive (also 370) with a second interface 372, or a bracket or housing of the hard drive thereof. In this particular example, the energy dampener is also positioned between the second electronic component and a third electronic component 380 with a third interface 382, which may be a bracket, housing, or other structure to which the hard drive may be attached using the fastener. Thus, the energy dampener is still considered to be positioned between the first and second electronic component, but it is also notably positioned between the first and third electronic component. During operation of the hard drive, there can be vibration and/or resonances that can lead to vibration noises, etc. Thus, an energy dampener can be included, as described with respect to FIG. 1 and elsewhere herein, with a carbon nanotube-aerogel matrix composited with a rubber. In this configuration, the energy dampener positioned between these two structures (or three structures in this instance) can either ameliorate or prevent noise, vibrations, resonances, etc., caused by operation of the hard drive initially, as well as over a longer period of time than in instances where there is no energy dampener in place.

Methods of Damping Energy within an Electronic Devices

Figure 4:
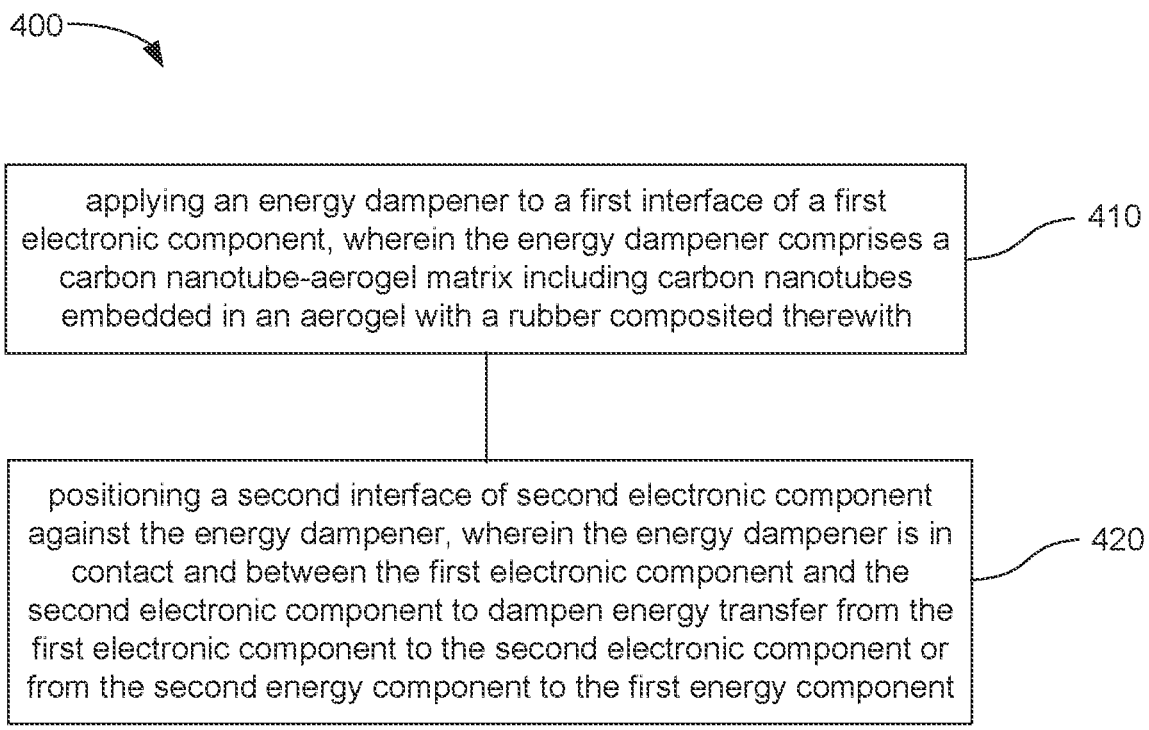
FIG. 4 is a flow diagram illustrating an example method of damping energy within an electronic device in accordance with the present disclosure.

In another example, as shown in FIG. 4, a method 400 of damping energy within an electronic device can include applying 410 an energy dampener to a first interface of a first electronic component. The energy dampener can include a carbon nanotube-aerogel matrix with carbon nanotubes embedded in an aerogel, with a rubber composited with the carbon nanotube-aerogel matrix. The method can further include positioning 420 a second interface of second electronic component against the energy dampener. A portion or all of the energy dampener can thus be in contact and between the first electronic component and the second electronic component to dampen energy transfer from the first electronic component to the second electronic component or from the second energy component to the first energy component. Applying the energy dampener can be carried out by forming the energy dampener on an intermediate substrate to be then removed therefrom (or not removed), and placed between the first and second interfaces (thus being applied to the first interface with positioning of the second interface against the energy dampener). Applying the energy dampener can alternatively include forming the energy dampener directly on the first interface of the first electronic component, and then positioning the second interface against the energy dampener.

The second interface may be part of a fastening system that fastens against or with the first electronic component at the first interface, or the second interface may itself include an energy dampener or some other soft structure that has been applied to the second interface. Thus, in one example, there may be two energy dampeners abutted together, one applied to the first interface of the first electronic component, and one applied to the second electronic component where the energy dampener provides the second interface. In one example, the method can include preliminarily compounding the carbon nanotube-aerogel matrix with the rubber by admixing the rubber with the carbon nanotube-aerogel matrix in the presence of a lubricant to form an extrudable composite. Thus, applying the energy dampener in one specific example can include extruding the extrudable composite onto the first interface under heat (or extruding onto an intermediate structure to be transferred to the first interface). In further detail, the method can also include shaping the energy dampener after applying to the first interface or after positioning the second interface by removing a portion of the energy dampener, e.g., cutting, melting, tearing, etc., excess away. The energy dampener can include a carbon nanotube-aerogel matrix including carbon nanotubes embedded in an aerogel, as mentioned. However, there may also be graphene or other similar structures also embedded in the aerogel. The electronic components can be as previously described, and include any of a number of structural, operational, and/or aesthetic components, for example. In some more specific examples, the energy dampener may be configured such as that shown in FIG. 1, or in other configurations, including in layers, e.g., a layer of rubber and a layer of carbon nanotube-aerogel matrix, or with multiple rubber layers, multiple carbon nanotube-aerogel layers, or both. In another aspect, the energy dampener can be shaped and positioned between structures such as those shown in FIG. 2 or 3.

Definitions

It is noted that, as used in this specification and the appended claims, the singular forms "a" "an," and "the" include plural referents unless the content clearly dictates otherwise.

The term "about" as used herein, when referring to a numerical value or range, allows for a degree of variability in the value or range, for example, within 5% or other reasonable added range breadth of a stated value or of a stated limit of a range. The term "about" when modifying a numerical range is also understood to include the exact numerical value indicated, e.g., the range of about 400 m$^2$/g to about 2,500 m$^2$/g includes 400 m$^2$/g to 2,500 m$^2$/g, as an explicitly supported sub-range.

As used herein, the term "aerogel" when referring to use within a carbon nanotube-aerogel matrix, energy dampener, electronic device, method for damping energy, etc. refers to open-celled, solid compositions that include a network of interconnected nanostructures, and can be produced in some instances by removing liquid from a gel material in a manner which retains or generates a structural network, They are dry materials that initially derived theft name from being formed removing liquid/water from the gels, but the method of preparation is not intended to be limiting. These materials can be porous, having a porosity volume (open cell volume) of 50% or more, e.g., carbon or graphene aerogels, 60% or more, 70% or more, 80% or more, 90% or more, 95% or more, or even 99% or more in some instances. By way of example, and not limitation, an aerogel may include silica aerogel, graphene aerogel, plastic aerogel, etc.

The term "graphene" refers to one of the allotropes of carbon and includes a two-dimensional structure on an atomic scale, which is associated with a honey-comb-configured lattice. The two dimensional structure of graphene provides a basis for forming other types of carbon allotropes, such as graphite, charcoal, carbon nanotubes, fullerenes, etc. A sample structure is shown by example in FIG. 1 at reference numeral 140. Graphene can be the basis for forming carbon nanotubes and graphene aerogels, but can also be carried by aerogels of various types, including graphene aerogels (as graphene carried by the graphene aerogel), silica aerogels, plastic aerogels, etc., in accordance with examples of the present disclosure.

The term "graphene aerogel," includes carbon-based aerogels including aerographene. Carbon-based aerogels can be formed of carbon particles in the nanometer range that are covalently bonded together. Aerographene can include carbon nanotube supports as well as graphene, e.g., around the nanotube supports. Though not the case in all instances, the solid portion of the aerogel can be less dense than air, with air present in its many open cells.

"Silica aerogel" is a type of aerogel that includes unreacted silanol (Si—OH) groups on the surface of their skeletons, thus providing hydrophilicity to this type of aerogel. Silica aerogels can be derived from silica gel or by other processes, e.g., modified Stober process, and can in some instances be less dense than air. Silica of the aerogel can be solidified in a three-dimensional structure of intertwined clusters that make up a small percentage of the volume, e.g., about 2 wt % to about 5 wt % or about 3 wt % in some examples. Most of the volume is air that is trapped in small nanopores with little room for movement.

"Plastic aerogel" includes polymer-reinforced aerogels as well as polymer-based aerogels, such as polyimide and other polymeric aerogels.

As used herein, the terms "nanotube," "carbon nanotubes," or the like, refers to tubular forms of carbon that can be produced on a nanoscopic level to have diameters in the nanometer range, e.g., from about 1 nm to about 30 nm, and lengths in the hundreds of nanometers to micron range, e.g., from about 0.2 μm to about 5 μm. It does not infer that the carbon nanotubes must be single-walled or multi-walled, although they can be either. Carbon nanotubes can likewise have various configurations, such as a chiral, zigzag, or armchair (two of which are shown in FIG. 1).

As used herein, the term "carbon nanotube-aerogel matrix" (or matrices) refers to a dispersion where carbon nanotubes are embedded in an aerogel. Other components may also be embedded in the aerogel, such as graphene that is not part of the aerogel but also embedded therein for example, but on a fundamental level, a carbon-nanotube-aerogel matrix includes at least an aerogel with carbon nanotubes embedded therein. Since an aerogel is a solid, the term "embedded" is used rather than "dispersed," but on a conceptual level, the carbon nanotubes can be thought of as being distributed within an aerogel volume, including both solid volume portions and open pore volume portions, for example. To form such a structure, the carbon nanotubes may be dispersed within a sol-gel colloidal dispersion prior to forming a gel and then drying to form the aerogel (with embedded carbon nanotubes), or may be dispersed within a gel after formation, but prior to drying, and then drying to form the carbon nanotube-aerogel matrix, for example. Thus, carbon nanotubes can be prepared and then dispersed in a dispersion or gel, and then become embedded as the gel is dried to for the aerogel. On the other hand, the carbon nanotubes can be formed in situ within or as part of aerogel, e.g., graphene aerogels may include carbon nanotubes and free graphene in an aerogel structure. Thus, these or any other technique for dispersing or embedding carbon nanotubes in an aerogel can be implemented in accordance with examples of the present disclosure.

Rubber is defined to include natural and/or synthetic rubber materials. "Natural rubber" refers to the elastic substance produced by coagulating and processing the fluid latex produced by various plants, such as polymers with the organic compound isoprene, and is characterized by its ability to stretch and its resilience. "Synthetic rubber" refers to the artificially produced elastomers having qualities similar to natural rubber.

As used herein, the term "composited" refers to the act of combining individual elements into a single unified element, including with components combined together as a single composited film, or as two or more layers that are physically and/or chemically bound together along one or more interface.

As used herein, the term "extrusion" refers to the process of heating and flowing a material from an extrusion device to be deposited onto (or coextruded with) another material.

The term "electronic component" refers to the individual parts or elements that, when combined, make up an electronic device. Such components may have an electrical, mechanical, or electromechanical function, and can include structural components, operational components, aesthetic components, etc. Typically one or more of the electronic components may generate or be subject to vibration or resonance that would benefit from dampening in accordance with examples of the present disclosure. Thus, the term "electronic component" does not infer that the component includes electronics, but rather is a component of an electronic device.

As used herein, the term "energy dampener" is understood to refer to a structure that can reduce or diminish energy that may be introduced to an electronic system electrically and/or mechanically by the electronic device itself or by an external force, e.g., input device such as a keyboard. The energy dampener can be a thin film or cushion positioned relative to multiple structures that may otherwise be in contact at that location to dissipate or diminish unwanted vibrational or resonance energy that may be introduced in the form of mechanical energy. An energy dampener can be positioned, deposited, shaped, and/or sized for application, for example.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or subranges encompassed within that range as if each numerical value and sub-range is explicitly recited. For example, a surface area range of about 400 $m^2/g$ to about 2,500 $m^2/g$ should be interpreted to include the explicitly recited limits of 400 $m^2/g$ and 2,500 $m^2/g$ and to include individual weights such as about 900 $m^2/g$, about 1,100 $m^2/g$, about 1,400 $m^2/g$, and sub-ranges such as about 1,000 $m^2/g$ to about 2,000 $m^2/g$, about 1,200 $m^2/g$ to about 1,500 $m^2/g$, etc.

EXAMPLES

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Composition of Carbon Nanotube-Aerogel Matrix and Rubber

A composition for forming an energy dampener film is prepared by admixing 96.8 wt % silicone rubber, 1.2 wt % stearic acid lubricant, and 2 wt % silica aerogel having both graphene and carbon nanotubes dispersed therein. As a note, the silica aerogel can be prepared by any method, such as suspending the carbon nanotubes and graphene in a silica gel and subjecting the dispersion to supercritical point drying, for example, where the temperature and pressure is raised above critical point followed by slow reduction of temperature and pressure to preserve the aerogel network that is formed by the drying process.

Example 2—Forming Energy Dampener

Once the silicone rubber, the stearic acid, and the silicon aerogel (with graphene and carbon nanotubes) are thoroughly admixed as described in Example 1, the resulting composition is loaded in an film-extruder, and a film having a thickness of about 0.15 mm is extruded onto a substrate at a temperature from about 180° C. to about 230° C. Thus, the substrate can be an intermediate substrate, and the film can then be removed and shaped to be positioned between multiple electronic components for dampening vibration, resonance, sound, or other resonances. Alternatively, the film can be extruded directly onto one or multiple electronic components during the assembly process for the electronic device.

What has been described and illustrated herein include examples of the disclosure along with some of its variations. The terms, descriptions, examples, and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An electronic device comprising:
a first electronic component;
a second electronic component; and
an energy dampener positioned between and in contact with the first electronic component and the second electronic component, wherein the energy dampener comprises a carbon nanotube-aerogel matrix which comprises carbon nanotubes embedded in an aerogel and composited with a rubber, the aerogel being selected from the group consisting of a silica aerogel and a plastic aerogel.

2. The electronic device of claim 1, further comprising a third electronic component, wherein the energy dampener is further positioned between the first electronic component and the third electronic component; or wherein the energy dampener is further positioned between the first electronic component and the third electronic component and between the second electronic component and the third electronic component.

3. The electronic device of claim 1, wherein the first electronic component includes one of a computer keyboard link bar or a keystroke plate, and the second electronic component includes the other of the computer keyboard link bar or the keystroke plate.

4. The electronic device of claim 1, wherein the first electronic component includes one of a fastener or a hard drive, and the second electronic component includes the other of the fastener or the hard drive.

5. The electronic device of claim 1, wherein the carbon nanotubes have a surface area of about 400 $m^2/g$ to about 2,500 $m^2/g$, and the aerogel has a surface area of about 1,500 $m^2/g$ to about 3,500 $m^2/g$.

6. The electronic device of claim 1, wherein the carbon nanotubes comprise single-walled carbon nanotubes.

7. The electronic device of claim 1, wherein the carbon nanotubes comprise multi-walled carbon nanotubes including an inner nanotube concentrically positioned within an outer nanotube.

8. The electronic device of claim 1, wherein the rubber is selected from the group consisting of silicone rubber, EPDM rubber, epichlorohydrin rubber, polyacrylic rubber, fluorosilicone rubber, fluoroelastomer, perfluoroelastomer, polyether block amide, chlorosulfonated polyethylene, ethylene-vinyl acetate, polysulfide rubber, thermoplastic elastomer, and a combination thereof.

9. The electronic device of claim 1, wherein the carbon nanotube-aerogel matrix further comprises graphene embedded in the aerogel.

10. The electronic device of claim 1, wherein:
the aerogel is the silica aerogel;
the rubber is silicone rubber; and
the carbon nanotube-aerogel matrix further includes graphene embedded therein.

11. The electronic device of claim 1, wherein the aerogel is the plastic aerogel, and wherein the plastic aerogel is a polyimide aerogel.

12. A method of damping energy within an electronic device comprising:
applying an energy dampener to a first interface of a first electronic component, wherein the energy dampener comprises a carbon nanotube-aerogel matrix including carbon nanotubes embedded in an aerogel and composited with a rubber, the aerogel being selected from the group consisting of a silica aerogel and a plastic aerogel; and
positioning a second interface of second electronic component against the energy dampener, wherein a portion or all of the energy dampener is in contact with and between the first electronic component and the second electronic component to dampen energy transfer from the first electronic component to the second electronic component or from the second energy component to the first energy component.

13. The method of claim 12, wherein prior to the applying, the method further comprises compounding the carbon nanotube-aerogel matrix with the rubber by admixing the rubber with the carbon nanotube-aerogel matrix in the presence of a lubricant to form an extrudable composite, and wherein the applying includes extruding the extrudable composite onto the first interface under heat.

14. The method of claim 13, further comprising shaping the energy dampener either i) after applying the energy dampener to the first interface or ii) after positioning the second interface, by removing a portion of the energy dampener.

15. The method of claim 12, wherein the carbon nanotubes have a surface area of about 400 $m^2/g$ to about 2,500 $m^2/g$, and wherein the aerogel has a surface area of about 1,500 $m^2/g$ to about 3,500 $m^2/g$.

16. The method of claim 12, wherein the carbon nanotubes comprise single-walled carbon nanotubes.

17. The method of claim 12, wherein the carbon nanotubes comprise multi-walled carbon nanotubes including an inner nanotube concentrically positioned within an outer nanotube.

18. The method of claim 12, wherein the rubber is selected from the group consisting of silicone rubber, EPDM rubber, epichlorohydrin rubber, polyacrylic rubber, fluorosilicone rubber, fluoroelastomer, perfluoroelastomer, polyether block amide, chlorosulfonated polyethylene, ethylene-vinyl acetate, polysulfide rubber, thermoplastic elastomer, and a combination thereof.

19. The method of claim 12, wherein the carbon nanotube-aerogel matrix further comprises graphene embedded in the aerogel.

20. An electronic device comprising:
a first electronic component including one of a computer keyboard link bar or a keystroke plate;
a second electronic component including the other of the computer keyboard link bar or the keystroke plate; and
an energy dampener positioned between and in contact with the first electronic component and the second electronic component, wherein the energy dampener comprises a carbon nanotube-aerogel matrix which comprises carbon nanotubes embedded in an aerogel and composited with a rubber.

\* \* \* \* \*